(12) United States Patent
Kurtz et al.

(10) Patent No.: US 9,618,711 B2
(45) Date of Patent: Apr. 11, 2017

(54) APPARATUS FOR FORMING A TRANSCEIVER INTERFACE, FERRULE, AND OPTICAL TRANSCEIVER COMPONENT

(71) Applicant: US Conec, Ltd., Hickory, NC (US)

(72) Inventors: Daniel D. Kurtz, Huntersville, NC (US); Darrell R. Childers, Hickory, NC (US); Michael E. Hughes, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 0 days.

(21) Appl. No.: 14/950,277

(22) Filed: Nov. 24, 2015

(65) Prior Publication Data

US 2016/0147026 A1 May 26, 2016

Related U.S. Application Data

(60) Provisional application No. 62/083,333, filed on Nov. 24, 2014.

(51) Int. Cl.
*G02B 6/42* (2006.01)
*G02B 6/32* (2006.01)
*G02B 6/38* (2006.01)

(52) U.S. Cl.
CPC ............. *G02B 6/4231* (2013.01); *G02B 6/32* (2013.01); *G02B 6/3839* (2013.01); *G02B 6/4292* (2013.01); *G02B 6/3853* (2013.01); *G02B 6/425* (2013.01); *G02B 6/4214* (2013.01); *G02B 6/4267* (2013.01)

(58) Field of Classification Search
CPC .......................... G02B 6/3839; G02B 6/4231
See application file for complete search history.

(56) References Cited

U.S. PATENT DOCUMENTS

| | | | |
|---|---|---|---|
| 7,287,914 B2 | 10/2007 | Fujiwara et al. | |
| 8,165,432 B2* | 4/2012 | Ohta | G02B 6/4214 385/15 |
| 8,936,403 B2 | 1/2015 | Howard et al. | |
| 8,985,865 B2 | 3/2015 | Howard et al. | |
| 2013/0308910 A1* | 11/2013 | Nishimura | G02B 6/381 385/78 |
| 2014/0205242 A1* | 7/2014 | Lee | G02B 6/43 385/72 |
| 2015/0131946 A1 | 5/2015 | Howard et al. | |

* cited by examiner

*Primary Examiner* — Omar R Rojas
(74) *Attorney, Agent, or Firm* — Michael L. Leetzow, P.A.

(57) ABSTRACT

An apparatus for forming a transceiver interface includes an fiber optic ferrule and an optical transceiver component. The fiber optic ferrule engages a mating plane of a lens array in the optical transceiver component. The engagement of the two components may be removable rather than fixed. The fiber optic ferrule also engages a mechanical interface to account for three degrees of freedom, while the engagement of the mating surfaces account for another three degrees of freedom.

13 Claims, 12 Drawing Sheets

APPARATUS FOR FORMING A TRANSCEIVER INTERFACE, FERRULE, AND OPTICAL TRANSCEIVER COMPONENT

REFERENCE TO RELATED CASE

This application claims priority under 35 U.S.C. §119 (e) to provisional application No. 62/083,333 filed on Nov. 24, 2014, the contents of which are hereby incorporated by reference in their entirety.

BACKGROUND OF THE INVENTION

Field of the Invention

Typically when multi-fiber optic ferrules mate to optical transceivers, the multi-fiber ferrule mates to the optical transceiver at a mating plane. The mating plane of the optical transceiver normally contains guide holes or guide pins to align the multi-fiber ferrule in the x, y, and rotation in the x/y plane. The mating plane aligns the ferrule in the z distance and the rotation in the y/z and x/z planes. Both the multi-fiber ferrule and the optical transceiver contain one component each that control all 6 degrees of freedom together. This approach is common in multimode optical links.

Photonic-enabled silicon transceiver devices typically have an actively aligned interconnect that is produced from silicon, fused silica, or other similar material. This actively aligned interconnect, typically a v-grove lapped with optical fiber attached, is epoxied in place. This approach is taken to maximize coupling efficiency due to the small optical core size of the optical fibers and low coefficients of thermal expansion (CTE) associated with the silicon, fused silica, or other similar material. The permanent attachment of the components greatly limits the ability to test the connection and manufacturing flexibility of the passive and active components in the interconnect. It is desirable to have a separable interface at the photonically-enabled silicon chip for next generation optical links.

Thus, an apparatus for forming a transceiver interface that is able to align the components and account for all six degrees of freedom without the effect of different CTEs of the components causing misalignment during operation. It is also beneficial if the components are separable, meaning that they are intended to be separated from one another repeatedly without destroying any of the components or means of joining the components.

SUMMARY OF THE INVENTION

The present invention is directed to an apparatus for forming a transceiver interface that includes a fiber optic ferrule that further includes a main body having a front end, a back end, and a first opening extending from the back end toward the front end, the first opening configured to receive optical fibers therein, and a bottom surface having a first portion and a second portion, the first portion having an optical aperture therein to allow light associated with the optical fibers to pass therethrough and the second portion having alignment projections extending from the bottom surface and away from the main body, and an optical transceiver component that further includes a lens array having a plurality of optical lenses, and a mechanical interface operatively attached to the lens array and having a joining surface, the mechanical interface having two openings extending into the mechanical interface through the joining surface to receive the alignment projections on the bottom surface of the fiber optic ferrule, the second portion of the bottom surface of the fiber optic ferrule and the joining surface forming a gap therebetween upon engagement of the fiber optic ferrule to the optical transceiver.

In some embodiments, the first portion defines a first mating surface that lies in a first plane, the second portion lies in a second plane, the joining surface of mechanical interface lies in a third plane, the second and third planes being offset from one another when the fiber optic ferrule and the optical transceiver component are mated.

In some other embodiments, the first portion has at least three fine alignment elements and the lens array has at least three fine alignment elements, each of the three fine alignment elements in the first portion cooperating with the at least three fine alignment elements on the lens array to align the optical aperture in the first portion of the fiber optic ferrule with the optical lenses.

According to another aspect of the present invention, a fiber optic ferrule to be used in an apparatus for forming a transceiver interface includes a main body having a front end, a back end, and a first opening extending from the back end toward the front end, the first opening configured to receive optical fibers therein, and a bottom surface having a first portion and a second portion, the first portion having an optical aperture therein to allow light associated with the at least two optical fibers to pass therethrough and alignment projections extending from the second portion away from the main body.

According to yet another aspect of the invention, an optical transceiver component to be used in an apparatus for forming a transceiver interface includes a lens array having a plurality of optical lenses, the plurality of optical lenses surrounded at least in part by a mating plane, and a mechanical interface operatively attached to the lens array having a joining surface, the mechanical interface having two openings through the joining surface to receive the alignment projections on the bottom surface of the fiber optic ferrule.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
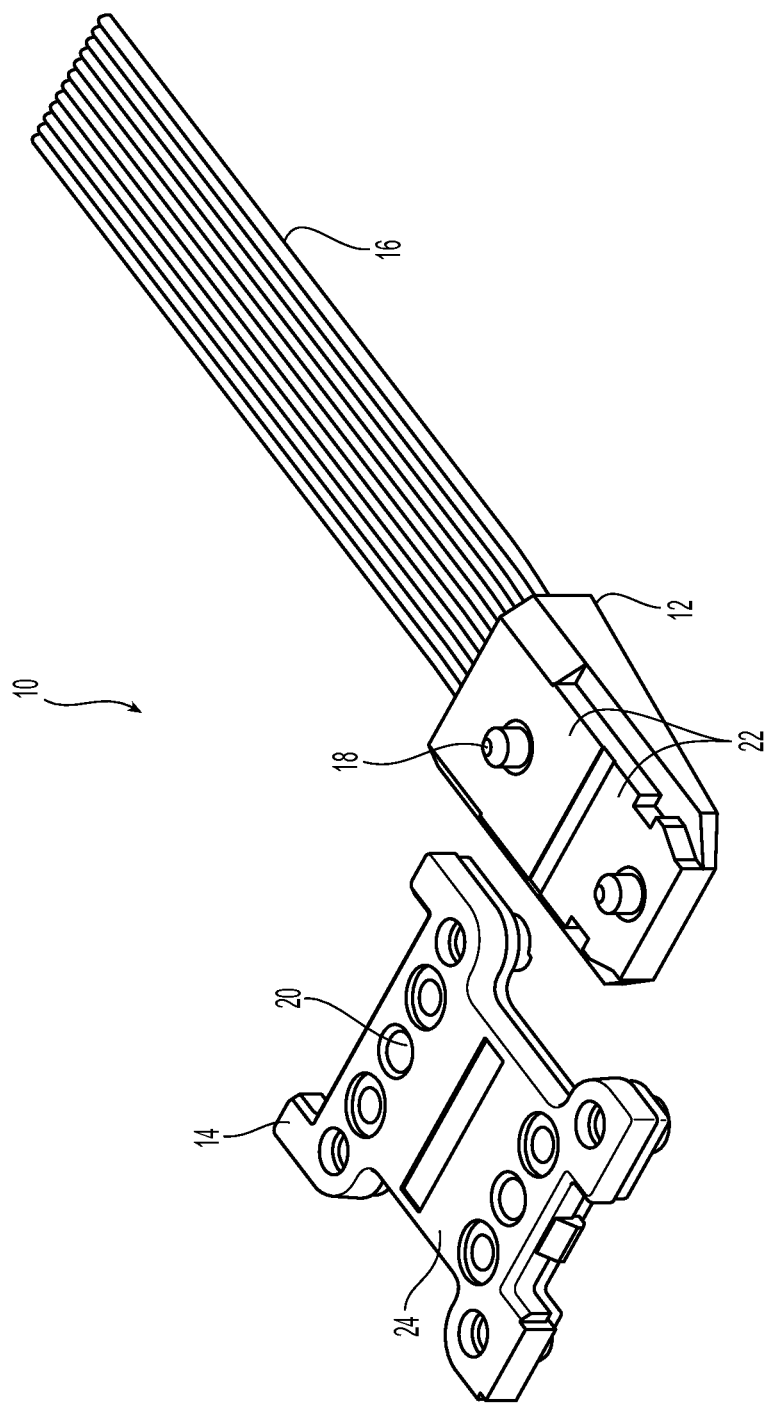
FIG. 1 is an exploded view of a prior art fiber optic ferrule and optical transceiver component showing mating surfaces.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
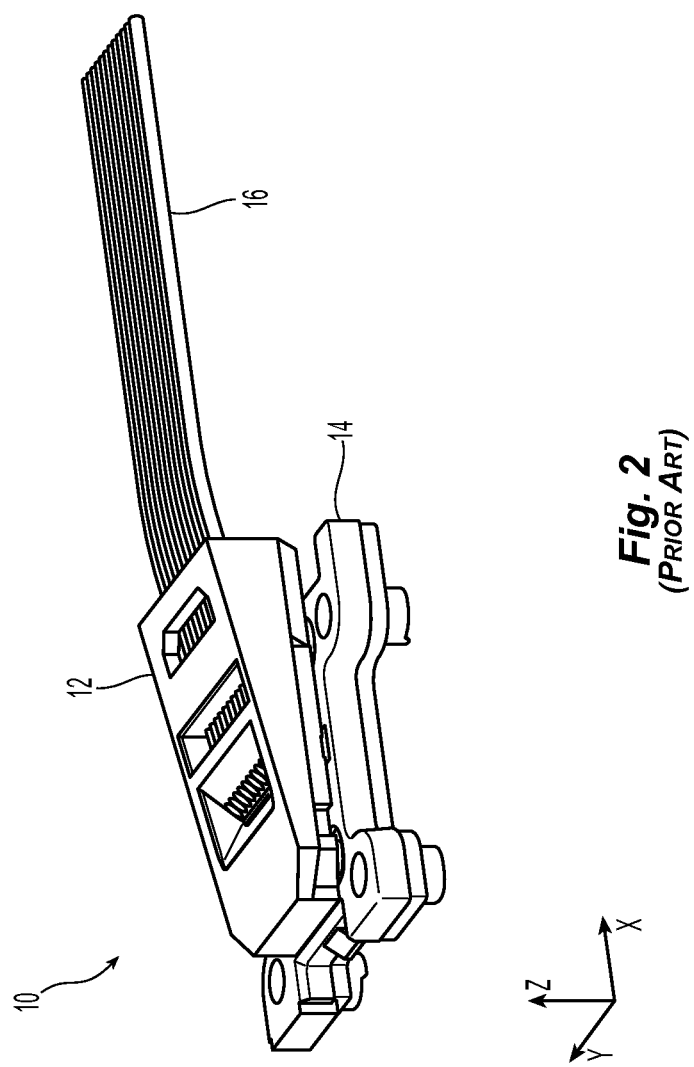
FIG. 2 is a perspective view of the mated fiber optic ferrule and optical transceiver component of FIG. 1.

Referring to FIGS. 1 and 2, one example of a prior art apparatus 10 for forming a transceiver interface includes a fiber optic ferrule 12 and an optical transceiver component 14, with optical fibers 16 fixed in the fiber optic ferrule 12. The fiber optic ferrule 12 has guide pins 18 and the optical transceiver component 14 has guide pin holes 20 to receive the guide pins 18. The guide pins 18 and the guide pin holes 20 control three of the six degrees of freedom: the location of the fiber optic ferrule 12 in the x and y directions and rotation in x/y plane. See FIG. 2. The fiber optic ferrule 12 and the optical transceiver component 14 also have mating planes 22,24, respectively. When the fiber optic ferrule 12 and the optical transceiver component 14 are engaged, as in FIG. 2, the mating planes 22,24 of the fiber optic ferrule 12 and an optical transceiver component 14, are in contact with one another. This contact aligns the fiber optic ferrule 12 to the optical transceiver component 14 in the z direction and the rotation in the y/z and the x/z planes.

Figure 3:
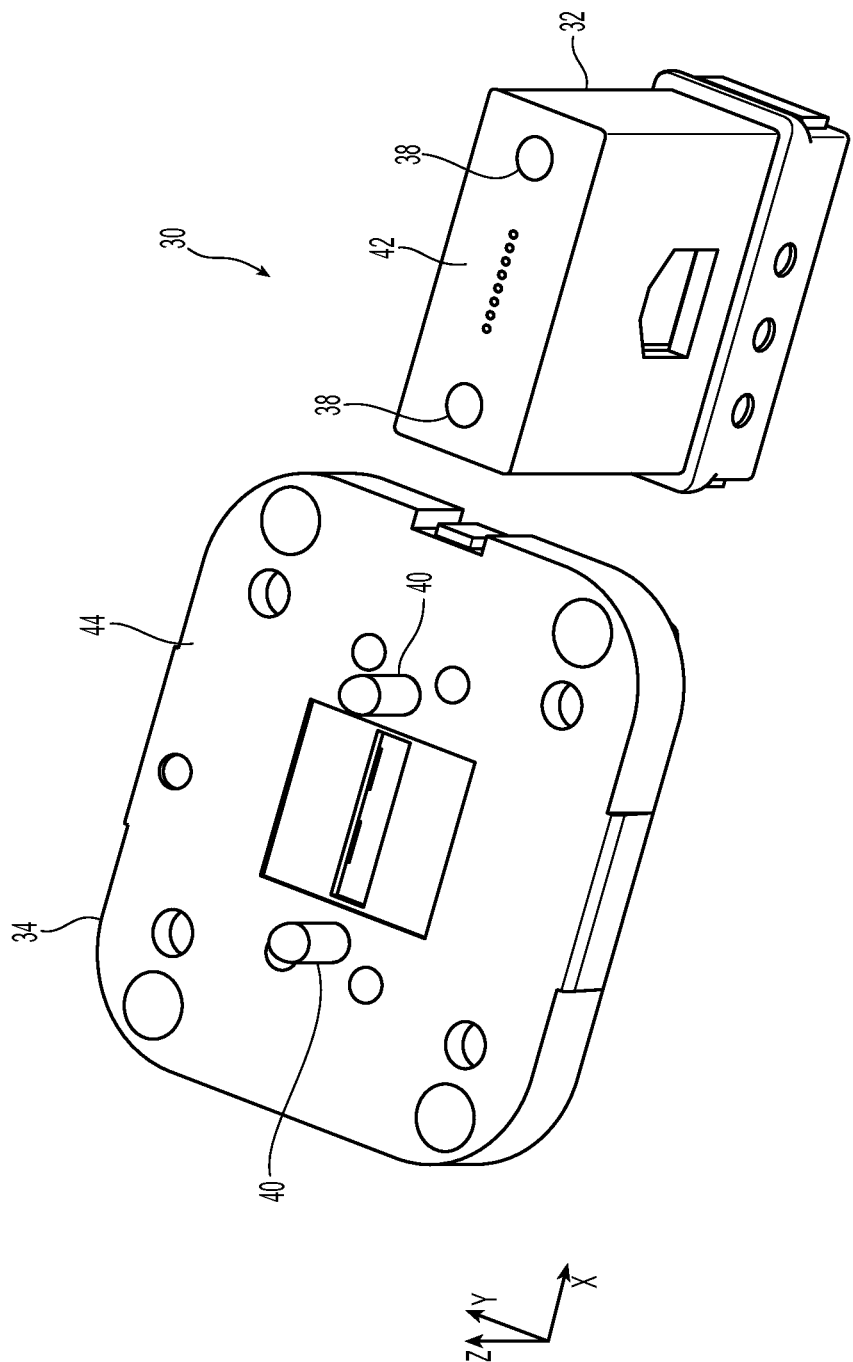
FIG. 3 is an exploded view of a second prior art fiber optic ferrule and optical transceiver component showing mating surfaces.
Figure 4:
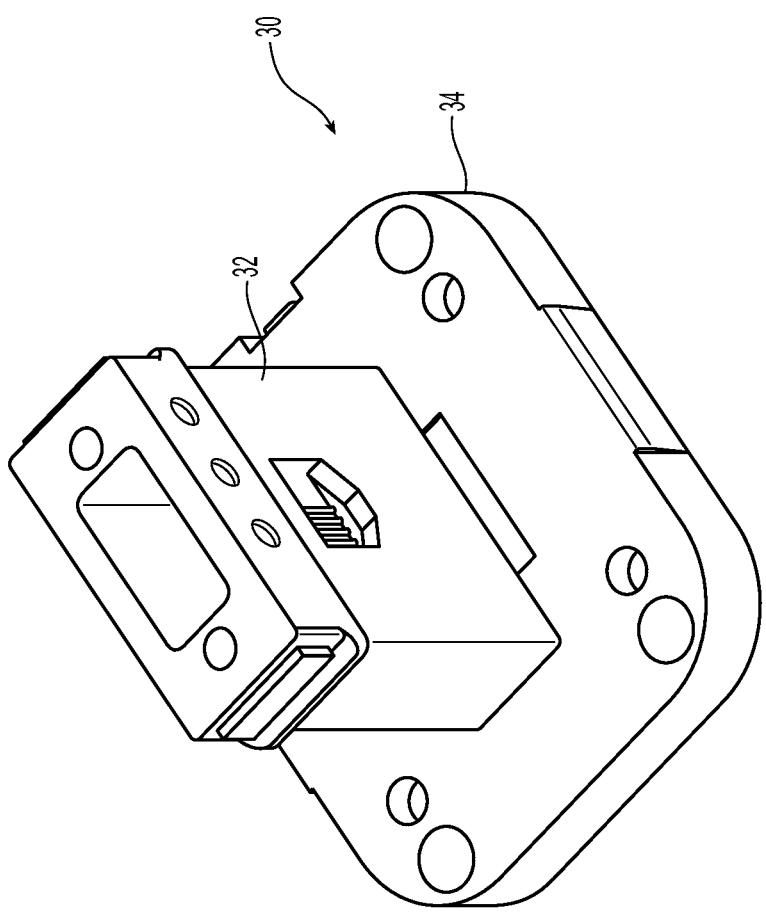
FIG. 4 is a perspective view of the mated fiber optic ferrule and optical transceiver component of FIG. 3.

The same is also true with the prior art apparatus 30 in FIGS. 3 and 4 for forming a transceiver interface that includes a fiber optic ferrule 32 and an optical transceiver component 34. Optical fibers, not shown, are fixed in the fiber optic ferrule 32 as is known in the art. The optical transceiver component 34 has guide pins 40 and fiber optic ferrule 32 has guide pin holes 38 to receive the guide pins 40. The guide pins 40 and the guide pin holes 38 control three of the six degrees of freedom: the location of the fiber optic ferrule 32 in the x and y directions and rotation in x/y plane. The fiber optic ferrule 32 and the optical transceiver component 34 also have mating planes 42,44, respectively. When the fiber optic ferrule 32 and the optical transceiver component 34 are engaged, as in FIG. 4, the mating planes 42,44 of the fiber optic ferrule 32 and an optical transceiver component 34, are in contact with one another. This contact aligns the fiber optic ferrule 32 to the optical transceiver component 34 in the z direction and the rotation in the y/z and the x/z planes.

Figure 5:
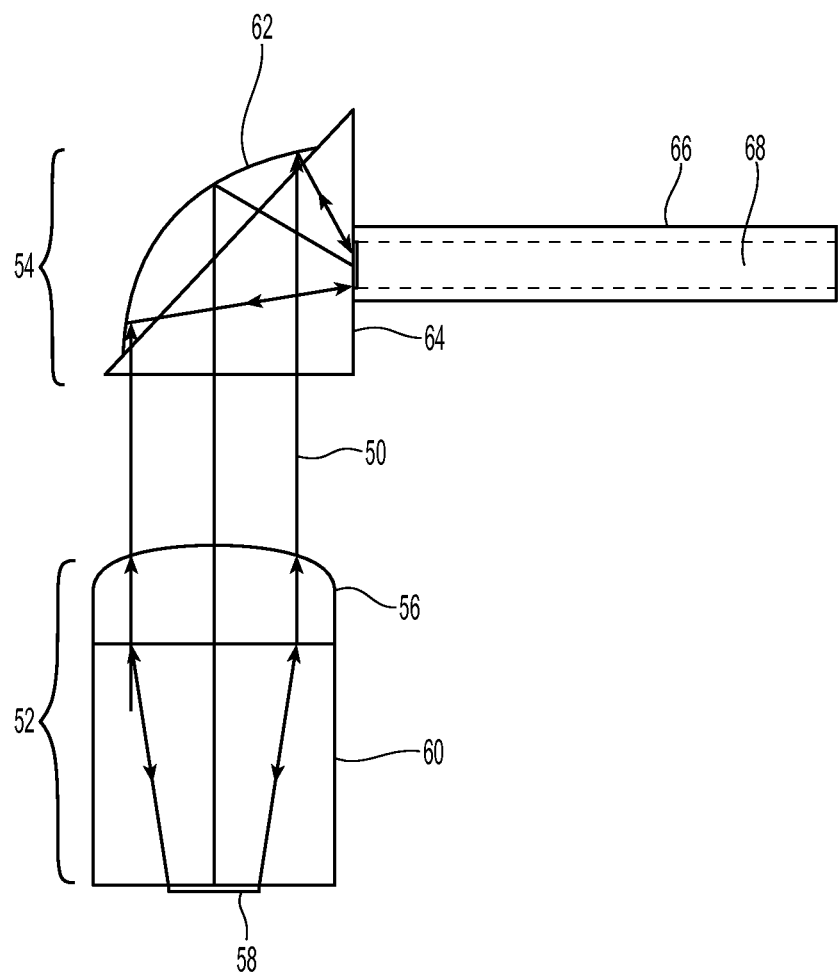
FIG. 5 is a schematic view of the optical geometry for a fiber optic ferrule and lenses in an optical transceiver component.
Figure 6:
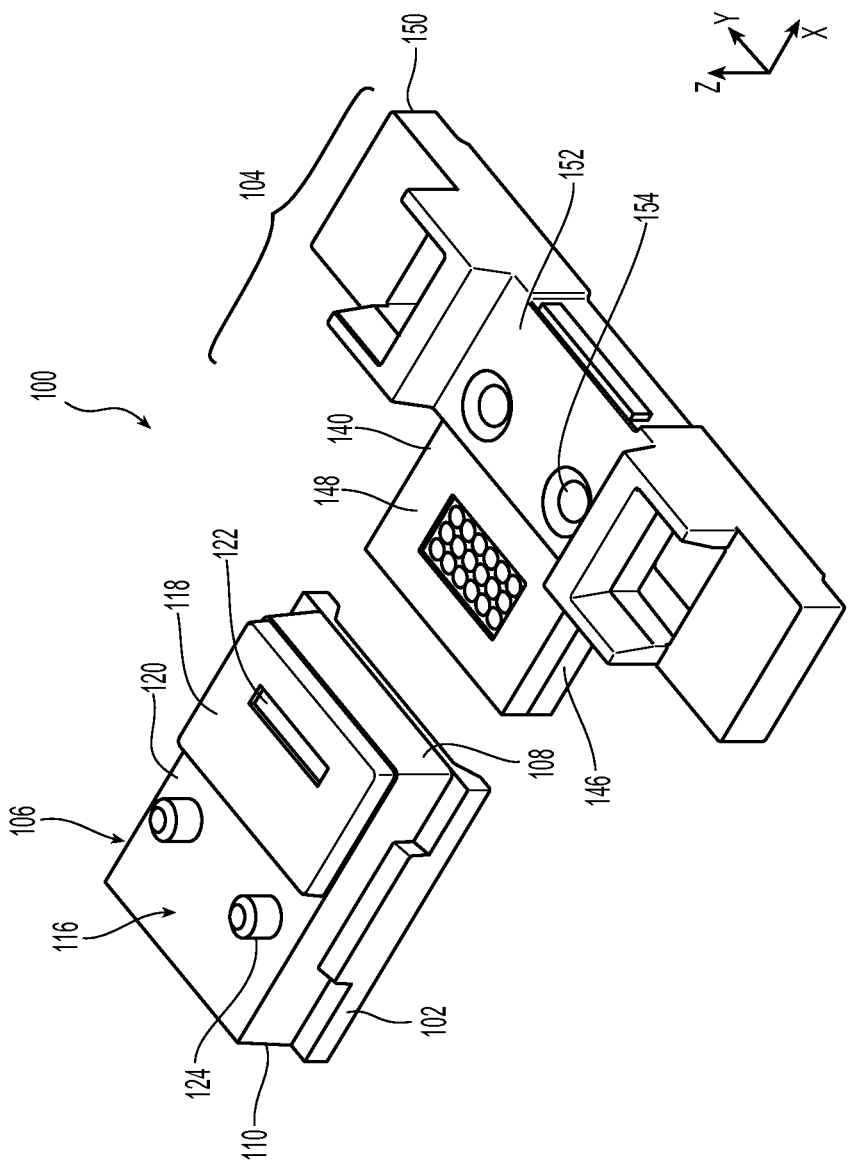
FIG. 6 is an exploded view of one embodiment of a fiber optic ferrule and optical transceiver component according to the present invention showing mating surfaces.
Figure 7:
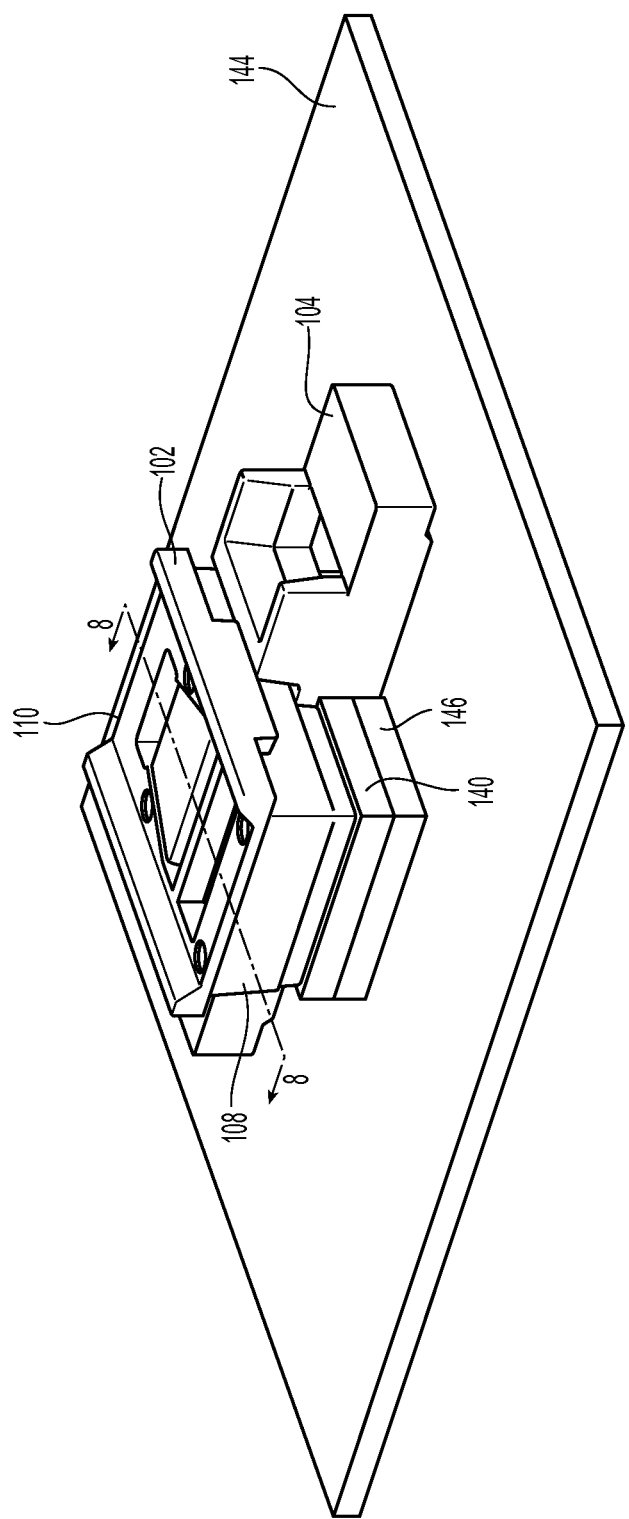
FIG. 7 is a perspective view of the mated fiber optic ferrule and optical transceiver component of FIG. 6.

However, there is a need to couple optical silicon devices to single-mode optical fibers through the use of a fiber optic ferrule—generally contained within a fiber optic connector. In the schematic diagram of FIG. 5, one design possibility is to use an expanded, collimated beam 50 between the transceiver 52 and the fiber optic connector 54. The space between the transceiver 52 and the fiber optic connector 54 is an air gap. The transceiver 52 has a lens 56 made from silicon, glass, or other low CTE material disposed above a silicon photonics aperture 58, which is often a grating coupler with a 9 micron diameter. Between the silicon lens 56 and the silicon photonics aperture 58 is typically an air gap, glass, or more silicon 60. The fiber optic connector 54 includes a lens 62 (typically exposed to air for total internal reflection) on the fiber optic ferrule 64, and an optical fiber 66 in alignment with the lens 62, the optical fiber 66 having a fiber core 68. The typical diameter of the optical fiber core 68 is about 9 microns. The expanded, collimated light beam 50 loosens the lateral alignment tolerances in the x/y plane between the fiber optic connector 54 and the transceiver enabling a separable connection, i.e., the air gap. The diagram represents a cross section in the x/z plane. Since the beam 50 is expanded and collimated between the transceiver 52 and the fiber optic connector 54, the lateral tolerance (alignment in the x/y plane) between the transceiver 52 and the fiber optic connector 54 is approximately 10 microns (significantly relaxed). Although the lateral tolerances are loosened by using an expanded beam, the angular tolerances between the ferrule lens 62 and the transceiver lens 56 must be tightened. In this case the angular tolerance should be approximately 0.2 degrees or better. Due to this tightened angular requirement, it is desirable to mate the ferrule component directly to the lens component. Furthermore, in this example the required tolerance between the lens 56 and the silicon photonics aperture 58 is approximately 1.5 microns. However, the silicon lens 56 and the silicon photonics aperture 58 are manufactured in arrays to maintain a low cost and high bandwidth density. The grating coupler array is made from silicon or another material with a low CTE. In order to maintain this tolerance, the lens array also needs to be made of a low CTE material such as silicon or glass. However, it is difficult to make alignment holes or pins in a lens array with low CTE materials as was previously done in the prior art. Therefore, it is necessary to separate the design into two components—a low CTE lens array and another component associated with the transceiver 52 that aligns the connector using guide pins or holes.

One such embodiment of an apparatus for forming a transceiver interface is illustrated in FIGS. 6-9. The apparatus 100 includes a fiber optic ferrule 102 and an optical transceiver component 104. The fiber optic ferrule 102 may have other additional components, including an adapter or other means to secure, and in a removable or separable manner, the fiber optic ferrule 102 to other components associated therewith. Similarly, the optical transceiver component optical transceiver component 104 may also have other components such as the silicon photonics aperture 58, a board on which the transceiver is mounted, etc.

The fiber optic ferrule 102 includes a main body 106, the main body 106 having a front end 108, a back end 110, and a first opening 112 (see FIG. 8) extending from the back end 110 toward the front end 108. The first opening 112 is configured to receive optical fibers (not shown) to align with lenses 114. The fiber optic ferrule 102 also has a bottom surface 116 having a first portion 118 and a second portion 120, the first portion 118 having an optical aperture 122 therein to allow light associated with the optical fibers to pass through the fiber optic ferrule 102. The second portion 120 having alignment projections 124 (guide pins in this case) extending from the bottom surface 116 and away from the main body 106.

Cooperating with the fiber optic ferrule 102 is optical transceiver component 104. The optical transceiver component 104 includes a lens array 140 with a plurality of optical lenses 142. The lens array 140 shows 18 lenses (3 rows of 6), but there could be more or fewer, depending on the number of optical fibers in the fiber optic ferrule 102 or the desire of the user. The lens array 140 is preferably etched from silicon or another low CTE material. The lens array 140 is preferably aligned to transceiver apertures (not shown) on a transceiver substrate 144. See FIG. 7. The lens array 140 may be bonded to the transceiver substrate 144 through a glass or silicon spacer 146.

The optical transceiver component 104 also includes a mechanical interface 150 that is also attached to the transceiver substrate 144. The mechanical interface 150 has a joining surface 152 that is aligned with the lens array 140 and the glass or silicon spacer 146 (and therefor also the transceiver apertures). The joining surface 152 has two openings 154 that are sized to receive the alignment projections 124 therein. Preferably, the openings 154 are slightly larger than the alignment projections 124, to allow some movement of the alignment projections 124 for the reasons discussed below.

Figure 8:
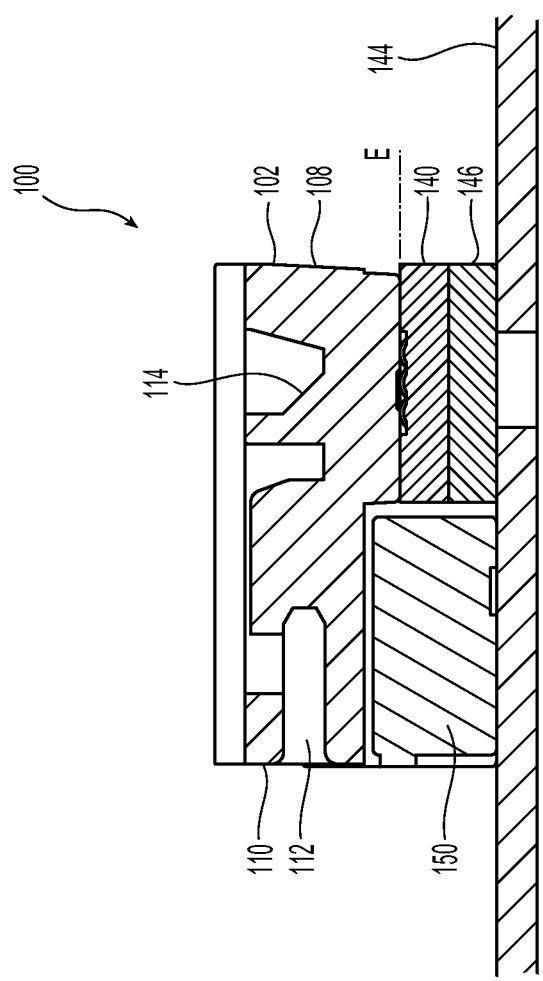
FIG. 8 is a cross section view of the mated fiber optic ferrule and optical transceiver of FIG. 7 along line 8-8.
Figure 9:
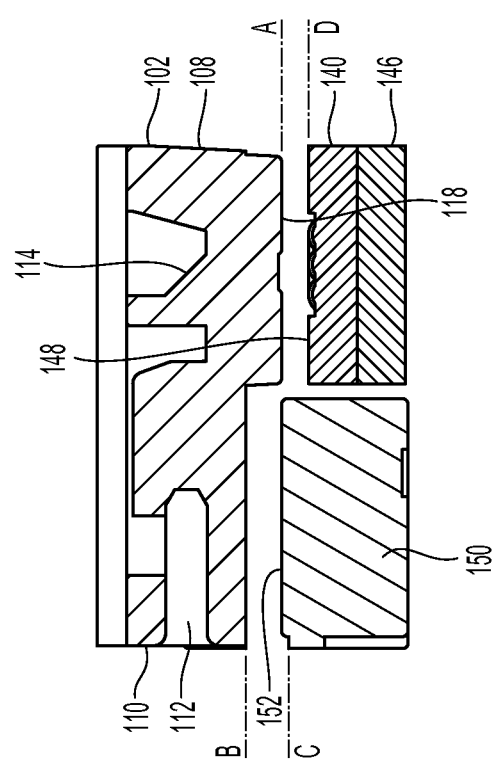
FIG. 9 is an exploded cross section view of the fiber optic ferrule and optical transceiver component of FIG. 8 to show surface planes.

The combination of the alignment projections 124 and the openings 154 provide control of three of the degrees of freedom—the alignment in the x and the y planes and also the rotation in the x/y plane. Since the mechanical interface 150 has been aligned with the lens array 140, then the fiber optic ferrule 102 mating to the mechanical interface 150 accounts for these three degrees of freedom. To account for the other three degrees of freedom (z alignment, and rotation in y/z and x/z planes), the bottom surface 116 of the fiber optic ferrule 102 makes contact with the mating surface 148 of the lens array 140. Since both the bottom surface 116, particularly the first portion 118, and the mating surface 148 of the lens array 140 are flat, the z alignment, and rotation in y/z and x/z planes are accounted for. These two surfaces, first portion 118 and the mating surface 148 of the lens array 140, are therefore mating surfaces in that they engage one another across the majority of the surface. In order to ensure that the bottom surface 116 and the mating surface 148 of the lens array 140 are able to make contact with one another (besides ensuring that they are both flat), the bottom surface 116, and particularly the second portion 120, cannot make contact with the joining surface 152 of the mechanical interface 150. As such, in one preferred embodiment, and as illustrated in FIG. 9, the bottom surface 116 has at least two different surfaces in different planes. The first portion 118 of bottom surface 116 is in plane A, while the second portion 120 is in a second plane B, which is parallel to plane A and offset therefrom. This configuration provides a step between the first portion 118 and the second portion 120, although any shape of transition between the two surfaces would be acceptable. Similarly, the joining surface 152 is in plane C, while the mating surface 148 of the lens array 140 is in plane D. When the fiber optic ferrule 102 and an optical transceiver component 104 are mated, the plane A of first portion 118 of the bottom surface 116 and plane D of the mating surface 148 of the lens array 140 join to form a joined plane E—as illustrated in FIG. 8. The important factor is that planes B and C are separated from one another so that the z alignment, and rotation in y/z and x/z planes are accounted for. The geometry and the relative location of the planes A, B, C, and D may be altered to a location other than that illustrated in FIGS. 8 and 9, as long as planes B and C are separated from one another and the joining plane E is formed by the second portion 120 of the bottom surface 116 (plane A) and plane D of the lens array 140.

Figure 10:
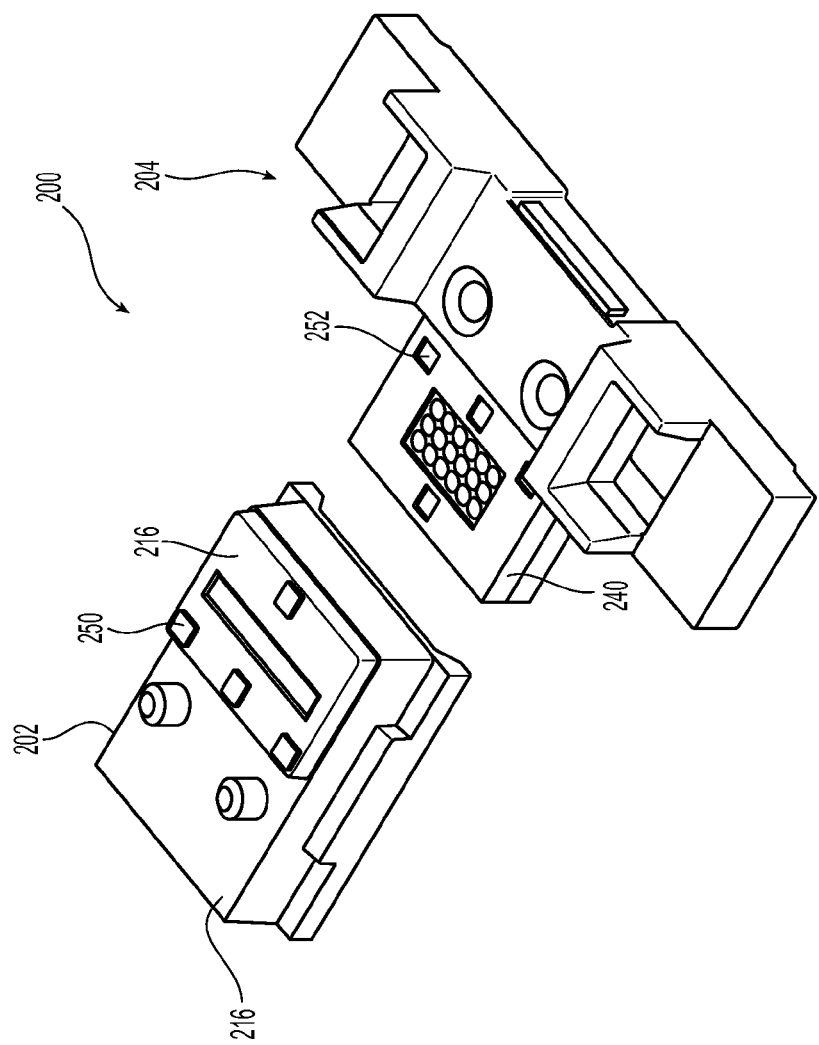
FIG. 10 an exploded view of another embodiment of a fiber optic ferrule and optical transceiver component according to the present invention showing mating surfaces.
Figure 11:
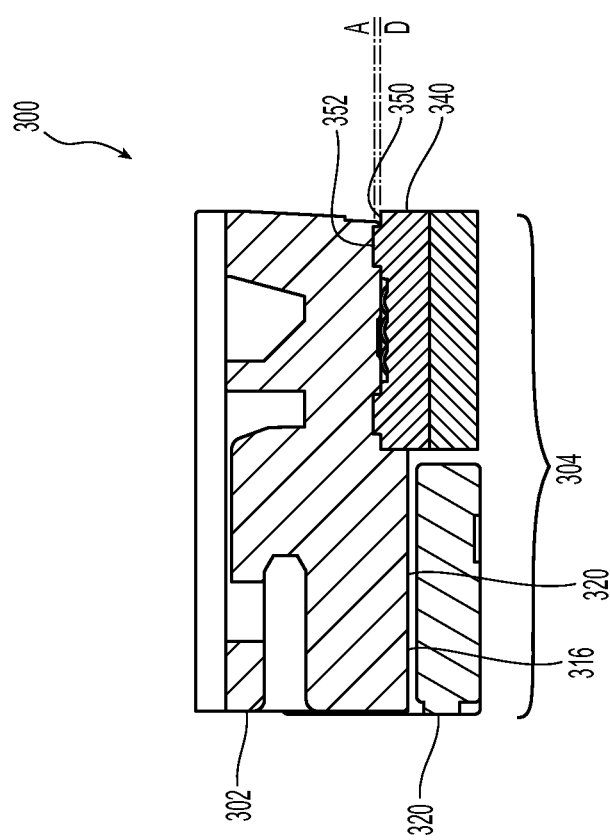
FIG. 11 is a cross section view of another embodiment of a mated fiber optic ferrule and optical transceiver component according to the present invention.

To further align the mating surfaces of the fiber optic ferrule and an optical transceiver component, more fine alignment elements may be used on the mating surfaces to further align the lenses in the fiber optic ferrule with the lens array. As illustrated in FIG. 10, another apparatus 200 for forming a transceiver interface includes a fiber optic ferrule 202 and an optical transceiver component 204. The fiber optic ferrule 202 is similar to the prior embodiment, but the bottom surface 216 of the fiber optic ferrule 202 has four fine alignment projections 250. The four alignment projections 250 extend above the first portion 218 of the bottom surface 216. The four alignment projections 250 are illustrated as square projections, but they could be of any size or shape and still come within the scope of the present invention. Additionally, they could be placed at other locations on the bottom surface 216. Preferably the tops of the four alignment projections 250 are flat, but again could have other configurations.

The optical transceiver component 204 has on its lens array 240 four corresponding depressions or holes 252. The engagement of the four alignment projections 250 with the four depressions or holes 252 should not interfere with the mating surfaces of the fiber optic ferrule 202 and an optical transceiver component 204 engaging one another (z direction).

It is also possible that the surface planes be moved relative to one another. Another another apparatus 300 for forming a transceiver interface includes a fiber optic ferrule 302 and an optical transceiver component 304. In this embodiment, the second portion 320 of the bottom surface 316 extends downward (toward the optical transceiver component) than the first portion. This means that plane B would be lower than plane A. Similarly, the mating surface of the lens array 340 is higher than the joining surface 352, meaning that plane D is higher than plane C. However, it should be noted that there is still a gap between planes B and C. In this embodiment, the alignment projections 350 and the alignment depressions 352 are reversed from the prior embodiment, in that alignment projections 350 are on the lens array 340 and the alignment depressions 352 are on the bottom surface 316.

Figure 12:
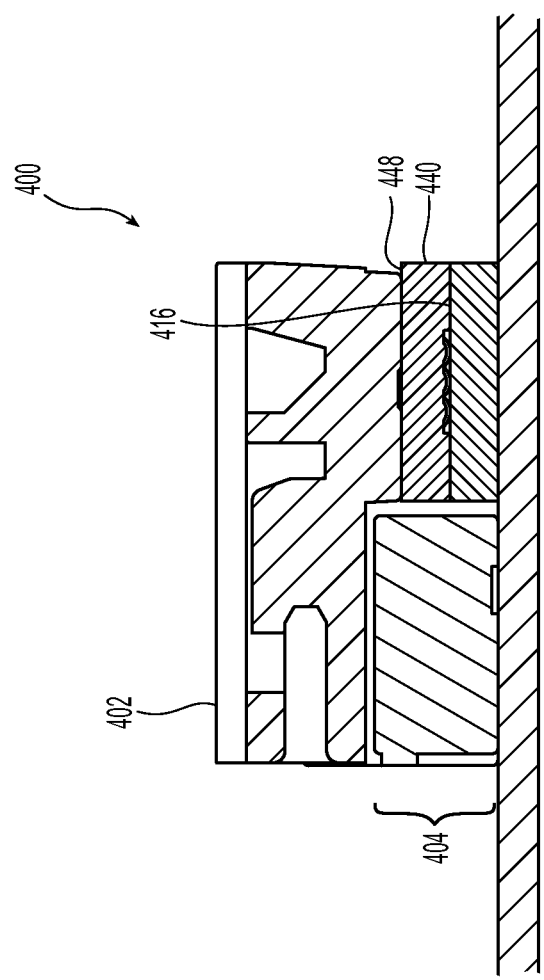
FIG. 12 is a cross section view of another embodiment of a mated fiber optic ferrule and optical transceiver component according to the present invention with lenses being covered.

Another apparatus 400 for forming a transceiver interface illustrated in FIG. 12 includes a fiber optic ferrule 402 and an optical transceiver component 404. In this embodiment, the lens array 440 is positioned such that the lenses are not on the upper side of the lens array 440. While the mating surface 448 still engages the bottom surface 416, the lenses are disposed more toward the transceiver substrate. As illustrated, the lenses are on the bottom side of the lens array 440, but the same effect could be realized by inserting another low CTE component, such as silicon, fused silica, glass or other similar material on top of the lens array 440.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An apparatus for forming a transceiver interface comprising: a fiber optic ferrule comprising:

a main body having a front end, a back end, and a first opening extending from the back end toward the front end, the first opening configured to receive optical fibers therein; and a bottom surface having a first portion and a second portion, the first portion having an optical aperture therein to allow light associated with the optical fibers to pass therethrough and the second portion having alignment projections extending from the bottom surface and away from the main body; and an optical transceiver component comprising:

a lens array having a plurality of optical lenses; and a mechanical interface operatively attached to the lens array and having a joining surface, the mechanical interface having two openings extending into the mechanical interface through the joining surface to receive the alignment projections on the bottom surface of the fiber optic ferrule, the second portion of the bottom surface of the fiber optic ferrule and the joining surface forming a gap therebetween upon engagement of the fiber optic ferrule to the optical transceiver.

2. The apparatus according to claim 1, wherein the first portion defines a first mating surface that lies in a first plane, the second portion lies in a second plane, the joining surface of mechanical interface lies in a third plane, the second and third planes being offset from one another when the fiber optic ferrule and the optical transceiver component are mated.

3. The apparatus according to claim 2, wherein the first and second planes are offset from one another.

4. The apparatus according to claim 2, wherein the lens array has a second mating surface lying in a fourth plane, the first and the second mating surfaces being in contact with one another and the first and fourth planes forming a joined plane.

5. The apparatus according to claim 4, wherein the joined plane is offset from the second and the third planes.

6. The apparatus according to claim 1, the first portion having at least three fine alignment elements and the lens array has at least three fine alignment elements, each of the three fine alignment elements in the first portion cooperating with the at least three fine alignment elements on the lens array to align the optical aperture in the first portion of the fiber optic ferrule with the optical lenses.

7. The apparatus according to claim 6, each of the fine alignment elements in the first portion having a surface parallel to and spaced from the first plane and each of the fine alignment elements in the lens array having a surface parallel to and spaced from the third plane.

8. The apparatus according to claim 6, wherein the fine alignment elements in the first portion are projections and the fine alignment elements in the lens array are cavities.

9. The apparatus according to claim 6, wherein the fine alignment elements in the first portion are cavities and the fine alignment elements in the lens array are projections.

10. The apparatus according to claim 1, wherein the alignment projections have a first radius and the openings have a second radius, the first radius being smaller than the second radius.

11. The apparatus according to claim 1, wherein the lens array is made from a material with a first coefficient of thermal expansion (CTE) and the fiber optic ferrule is made from a material with a second CTE and the first CTE is less than the second CTE.

12. The apparatus according to claim 1, wherein the mechanical interface is attached to a transceiver substrate.

13. The apparatus according to claim 1, wherein the lens array is aligned with an aperture in an optical transceiver.

* * * * *